Oct. 4, 1955     J. A. PERSSON     2,719,900
HIGH SPEED-SHEET METAL INERT-GAS SHIELDED ARC-WELDING
Filed March 25, 1952
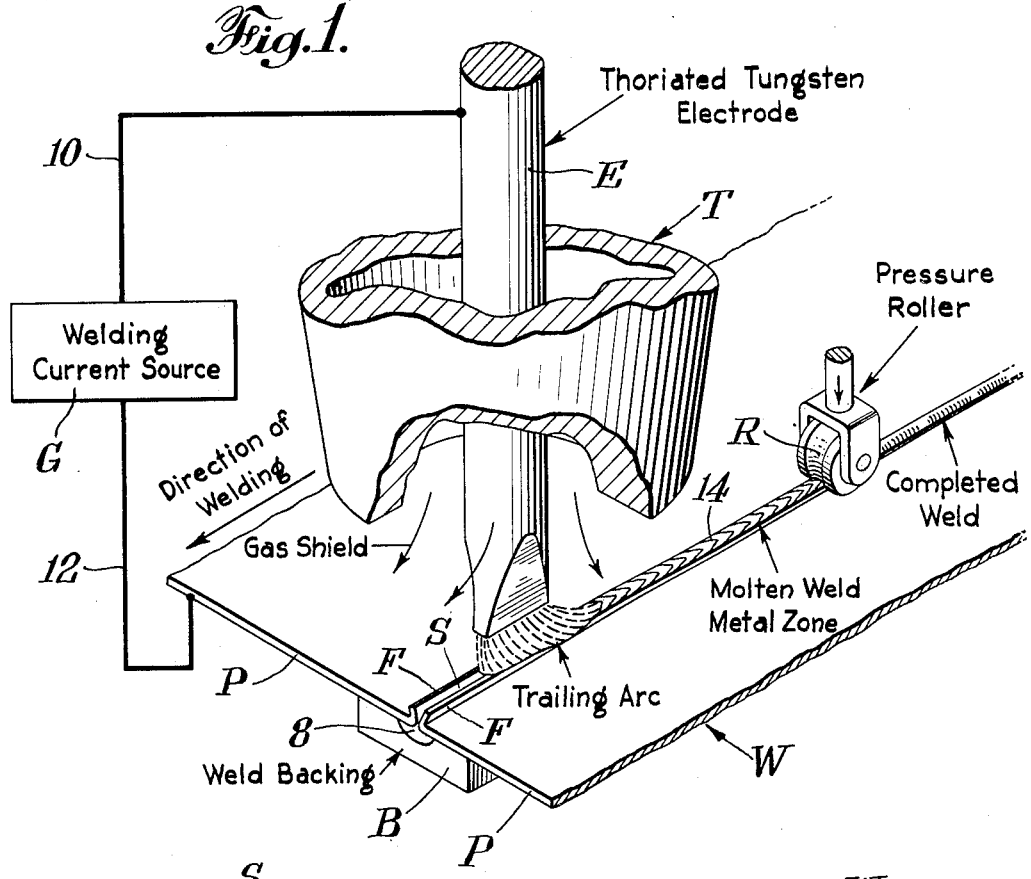
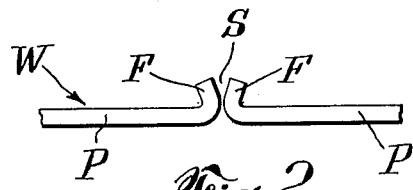
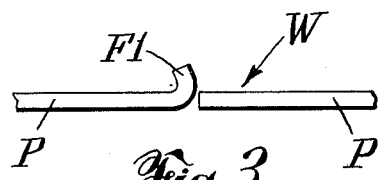
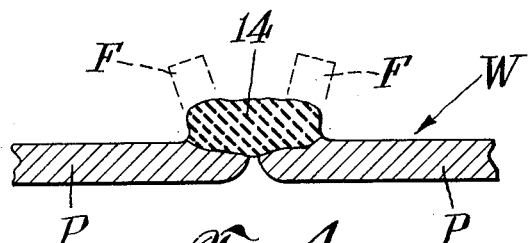
INVENTOR
JOHN A. PERSSON United States Patent Office 2,719,900
Patented Oct. 4, 1955

2,719,900

HIGH SPEED-SHEET METAL INERT-GAS SHIELDED ARC-WELDING

John A. Persson, Kenmore, N. Y., assignor to Union Carbide and Carbon Corporation, a corporation of New York Application March 25, 1952, Serial No. 278,439

3 Claims. (Cl. 219—10)

This invention relates to gas shielded arc-welding, and more particularly to the seam welding of light gage sheet metal at extremely high speed. Although not limited thereto, the invention will hereinafter be particularly described in connection with the welding of side seams in cans.

The limited supply of tin in the United States has seriously concerned the can making industry which has to extend its allotment of tin and, at the same time, increase its production. Substantial amounts of tin are involved in the solder used in can seams, and the elimination of soldered seams would accordingly be desirable.

One of the aims of this invention is the eventual incorporation of satisfactory can-seam welding into existing can making equipment with the least possible trouble. Cans are made on a series of automatic machines collectively known as a "can line." Sheets of can stock (low carbon steel having a thickness of 0.010 inch) are first fed into a slitter which cuts them into blanks from which can bodies are later formed. The body blanks are then fed into a body maker, the first station of which notches the blanks. They are then flanged and the flanged blanks are formed around a mandrel and bumped to form the side seam of the can. The latter operation leaves the seam on the underside of the mandrel for the soldering operation which follows. It is at this station and in such position that the welding is preferably to be done. The notching results in a seam having but two thicknesses of metal at the ends, while the main part of the seam is twice as thick. The reduced thickness of metal is necessary for the closure operations which follow and no greater thickness will be allowable in the development of any side seam welding operation.

A modern can body making machine produces up to 400 cans a minute. Since the various body-forming operations are of a sequential nature, the time that is allotted for a possible welding operation is only about one-third of the body-making cycle. Thus, the seam in a 211 by 600 (2<sup>11</sup>⁄<sub>16</sub>-in. diameter by 6-in. long) can must be welded at approximately 7,200 inches per minute in order to maintain the aforementioned production. In other words, a weld 6 inches long must be completed in only 0.05 second. Consequently, the high production rates of modern can manufacturing plants imply sheet-metal welding speeds of an order not previously considered possible by previous fusion welding techniques.

The main object of this invention is to provide a novel process of welding sheet metal at a speed in excess of 1000 inches per minute, which for example is well suited for fusion welding the side seams on can bodies in production, and also is simple, economical, clean, efficient, and effective. Other objects will appear in the following description.

According to the invention this is accomplished by first slightly flanging one or both edges of the stock to be welded so that the flanges are bent about 110° with the plane of the sheet, i. e., the flange is bent about 20° back past 90° to form an included angle of about 70° with respect to the sheet stock on which the flange is formed. It is preferable that the included angle between such flange and the work falls between 45° and 90°. The height of the flange above the sheet should be as low as practicable, about two times the thickness of the sheet, i. e., of the order of 0.015–0.025 inch for 0.010 inch thick sheet, for example. Furthermore, there should be a space between the butted sheets at the root of the joint, from 0.003 inch to 0.010 inch wide.

A direct-current arc is struck between such flanged seam and a thoriated tungsten electrode, i. e., one having a relatively low work function, while a stream of suitable gas such as inert monatomic gas shields the arc zone. The gas shielded arc is moved along the seam at a speed in excess of 1000 inches per minute, progressively fusing the flanged seam metal and welding the parts therealong. In the case of can stock the weld metal, while still soft, may be subjected to the pressure of a forming or flattening roll; but in other cases, such step may be omitted.

Successfully fusion welding sheet metal progressively along the seam at such extremely high speeds is a truly remarkable achievement in view of the fact that inert-gas-shielded arc-welding prior to the invention was limited to considerably less than 500 inches per minute. The process simplifies cleaning because no flux is necessary, and electrical controls are simple because a non-consumable electrode (thoriated tungsten) is employed.

In the drawing:

Fig. 1 is a fragmentary perspective view of a welding set-up illustrating the invention;

Figs. 2 and 3 are end views showing double and single-flanged seam arrangements, respectively; and Fig. 4 is a greatly enlarged cross-sectional view of a double-flanged seam after being welded.

As shown, the sheet metal parts P, P of the work W are flanged at F, F, Figs. 1, 2 and 4, and positioned on a weld backing member B composed of metal such as steel or copper, the former being preferred, to provide a seam S between such flanges over a slight groove 8. A gas shielded arc welding torch T having a thoriated tungsten electrode E is mounted in arc welding position with respect to such seam and is connected to a welding current source such as a generator G by leads 10 and 12, so that welding of the seam is accomplished by a direct-current arc, preferably at straight polarity. Alternating current is not suitable due to the very high speed at which the torch T moves with respect to the seam S.

During the welding operation the arc having a trailing component, shielded by an inert gas stream discharged by the torch T, progressively melts metal of the flanges F, F, leaving a weld-bead 14 of such metal uniting the parts P, P. Such bead is optionally flattened by a pressure roller R, following the torch T while the metal is still molten or plastic.

As shown in Fig. 3, in some assemblies only one edge of the work is flanged at F1.

The shape and size of the edge flanging is important because if sheets of can stock are simply overlapped and clamped in position for welding, an arc of 700 to 1000 amperes cuts a slot through the top layer, when the linear speed of travel is of the order of 3,000 inches per minute, resulting in separation of the second layer from the first because of heat distortion. In attempting to weld through a lock seam, the arc cut through the top surface, separating it from the second layer which showed negligible evidence of being affected by the arc. Also, unsatisfactory results were obtained by trying to weld in the groove which is inherent in the lock seam. The arc cut through the triple-ply edge without forming a seal.

Flanges set at 90° result in weak joints upon welding. In addition, the crest of the weld is bumpy. I have found that the best edge preparation is a flange on each sheet with a height of about 0.020 inch (plus or minus 0.005 inch) above the sheet surface. The butting of the sheets at the bottom is critical, and the distance between the sheets at the root of the joint in this case should be no less than 0.003 inch or greater than .010.

While such arrangement, as welded, results in a good seal, it leaves a ridge that is somewhat too high for putting on the ends of the can. The overall thickness of the welded seam should be no greater than 0.020 inch to ensure a satisfactory end closure. Ultraslow motion pictures of the welding operation revealed that the weld metal remained molten for some distance behind the arc. Rolls with or without grooves fixed to handles were then pressed against the weld about an inch behind the arc and, with moderately low pressure, the ridge could be pressed to conform to the shape of the groove in the roll. Another advantage of this rolling operation was that it was possible to make welds in joints in which only one of the sheets had been flanged, Fig. 3, the other being straight-edged. This type of joint has less material to be formed and requires less current to effect full penetration.

The initial experimental work on the flange-butt welding of can stock was done with tungsten electrodes, and the arcs were initiated by shorting the gap with a tungsten or carbon rod. With increased currents (up to about 1100 amperes) and speeds (up to 5,000 inches per minute), such method of starting the arc led to electrode deterioration which became more rapid as the currents were increased, even though the diameter of the electrode was also increased to as much as ½ inch. An attempt was made to overcome such trouble by initiating the arc with superimposed high-frequency voltage. Excessive electrode deterioration persisted until I substituted a 3/16-inch diameter thoriated tungsten electrode for the one of tungsten. The resultant welds were uniform from one end to the other.

A number of ultraslow motion pictures were taken under the above conditions, comparing tungsten and thoriated tungsten electrodes in order to obtain information that might be used to improve the welding action. These showed that tungsten was ejected in a stream of globules from the molten tip of a ¼-inch diameter tungsten electrode. The tip of a 3/16-inch diameter, thoriated tungsten electrode, however, did not melt, nor was there any metal loss noticed as in the case of the tungsten electrode despite the difference in their diameters. These results indicated that the loss of tungsten was due to unsatisfactory electrical properties rather than inadequate protection by the shielding gas, or by contamination of the electrode by metal from the work being welded.

The pictures also showed that the arc trailed at an angle of about 50° from the vertical. Since, in most cases, an arc having a trailing component was heretofore considered detrimental to welding because it resulted in undercut welds and holes, the present satisfactory welding results with such an arc are wholly new and unexpected.

To meet the specific requirements of a good can seam, it is necessary to have a flange of such size that the metal thereof, when melted, merely fills the space that occurs when butting the two edges to be welded. The arc must melt down such flange and fuse the two edges of the joint. This implies that a very narrow nugget is required, which is contrary to the nature of an arc, which usually leaves a broad trail compared with its depth of penetration. Thus, anything that concentrates the arc to a narrow path and increases its penetration would appear to be beneficial. The flange preparation concentrates the arc, and the heat transfer characteristics are such, that the melting proceeds to a greater depth than would occur by arcing on a flat sheet.

A thoriated tungsten electrode ground to a blunt chisel edge is preferred because such an electrode retains its shape during welding, and the arc does not wander off the seam during welding when the edge of the electrode is parallel to the seam.

A preferred welding current source is one by which a three-phase 440-volt supply is suitably transformed and rectified into direct current welding power. Oscillographic studies show very uniform current and voltage characteristics and a very rapid response in such a supply. The welding current should be about 1,000 amperes and the arc voltage about 15 volts (70 volts open circuit) for welds at 5,000 inches per minute. Actual welds made according to the invention with a power supply of this type are uniform from start to finish.

To summarize, the present invention makes it possible to progressively weld the side seams on can bodies or other thin metal assemblies at speeds compatible with present day can manufacturing rates of production. A flange-butt weld, wherein the flanges are 0.020 inch high, and each bent at an angle of more than 90° with the plane of the stock, i. e., form an included angle of less than 90° with the sheets to which they are connected, is important. The metal remains molten or plastic for a considerable distance behind the arc, and form rolling may be used to obtain the desired contour and thickness of the final weld. Thoriated tungsten electrodes are preferred for welding can stock at high speed, according to the invention, inasmuch as pure tungsten electrodes deteriorate rapidly.

Contrary to the prior art, welding according to the present invention is accomplished with an arc having a trailing component. Such a trailing arc is normally considered detrimental, but is employed in the present invention. Undercutting often results when a trailing arc is employed. When the current is increased, a cutting action is obtained more readily with a trailing arc. By employing the type of flange preparation that is used by this invention, such effects are avoided. This results in the new and unexpected arc welding of sheet metal at the phenomenal speed of 1,000 to 8,000 inches per minute and more, which to my knowledge has never been possible heretofore. Welding at such high speeds is readily achieved because the welding time is so short. Because the can welding action is intermittent, a ¼" diameter thoriated tungsten electrode, for example, can carry over 3,000 amperes on a 33 per cent duty cycle; i. e., .05 sec. on .10 sec. off. Its continuous duty rating is considerably less.

The use of argon gas is preferred over helium because, for comparable results, about twice the flow rate of argon is required for helium. However, any suitable gas can be employed to shield the arc. Because no flux is used, there is no cleaning problem, and the welds made according to the present invention are stronger than soldered lock seams generally made in forming cans.

Welds on can stock that meet requirements for a can body side seam have been produced by the invention. The tensile strength transverse to the welds ranged from 36,000 p. s. i. to 52,000 p. s. i. based on the thickness of the can stock used (0.010 in.). Samples of soldered lock seams had tensile strengths ranging from 14,500 to 28,100 p. s. i. (also based on the thickness of the can stock). Thickness through the joint was reduced through the use of a follow roller and a groove in the backup bar. To be compatible with present can making operations, this dimension should be no more than 0.020 inch. These favorable results were obtained under the following conditions:

| | |
|---|---|
| Spacing electrode to top of flanges _____in__ | 0.005 |
| Spacing root of flanges _____in__ | 0.005 to 0.007 |
| Welding speed _____I. P. M__ | 5000 |
| Current _____amperes__ | 850 |
| Voltage _____volts__ | 15 |
| Argon consumption _____C. F. H__ | 30 |

It has been determined that a coating on the underside of the stock can come within ¼ inch of either side of the seam. In the preparation of can stock for welding, this means that an uncoated strip ½ inch wide is sufficient for electrical contact. This area is coated after the can body has left the welding station.

The invention, while highly suitable for such purpose, obviously is not limited to welding cans.

I claim:

1. Process of arc welding sheet metal progressively along a seam at a speed of at least 1,000 inches per minute, which comprises flanging at least one edge of the stock to be welded so that the resulting flange forms an included angle of less than 90° with the sheet to which it is attached, butting such edges, and progressively melting such flange and the adjacent metal along the seam with a metal fusing electric arc, shielding the latter with a suitable gas, and moving such arc at a speed in excess of 1,000 inches per minute relatively to such seam.

2. A high-speed sheet-metal inert-gas shielded arc-welding process which comprises flanging at least one edge of the sheet metal stock to be welded so that the flange forms an included angle of between 45° and less than 90° with the plane of the sheet to which the flange is attached, the width of such flange being of the order of twice the thickness of such sheet, butting the sheets at the bottom to form a welding seam so that the distance between the sheets at the root of the joint is more than 0.003 inch but less than .010, mounting the so prepared seam on a metal backing member, striking an arc between such flanged seam and the end of an electrode while shielding the arc zone and adjacent metal with a stream of inert gas selected from the class consisting of argon and helium, supplying such arc from a direct current source so that fusion welding of the seam is accomplished at straight polarity, and moving said electrode in the direction of such seam at a linear speed of the order of 1,000 to 8,000 inches per minute, which results in a trailing component arc which progressively fuses the flanged seam, resulting in a continuous weld along such seam.

3. A high speed-sheet metal gas shielded arc-welding process which comprises precision flanging both edges of black-iron sheet metal stock to be welded so that the flanges form included angles of 45°–90° with the plane of the sheet to which the corresponding flange is attached, the width of such flanges being of the order of twice the thickness of such sheet, critically spacing the sheets between 0.003 and 0.010 inch at the bottom to form a welding seam, mounting the so prepared seam on a grooved metal backing member, striking a direct current 700–2,000 ampere arc between such flanged seam and the end of a thoriated-tungsten electrode having a blunt chisel edge extending parallel with such seam, while shielding the arc zone and adjacent metal with a stream of substantially pure inert-gas, and relatively moving said electrode in the direction of such seam at a linear speed of at least 1,000 inches per minute, progressively fusing the flanged seam, resulting in a continuous weld.

References Cited in the file of this patent

UNITED STATES PATENTS

| | | |
|---|---|---|
| 986,506 | Sargent | Mar. 14, 1911 |
| 2,160,586 | Gettig et al. | May 30, 1939 |
| 2,475,357 | Miller | July 5, 1949 |
| 2,515,559 | Lancaster et al. | July 18, 1950 |
| 2,528,758 | King | Nov. 7, 1950 |